United States Patent [19]
Cheng

[11] Patent Number: 5,929,228
[45] Date of Patent: Jul. 27, 1999

[54] CELLULOSE SOLUTION WITH LOW VISCOSITY AND PROCESS OF PREPARING THE SAME

[76] Inventor: Meng-Song Cheng, 5th Fl., No. 1, Lane 107, Changlu Rd., Changhua City, Taiwan

[21] Appl. No.: 09/020,318

[22] Filed: Feb. 9, 1998

[51] Int. Cl.$^6$ ............................... C08B 16/00; C08L 1/24
[52] U.S. Cl. .................... 536/56; 536/57; 106/166.01; 106/166.4; 106/166.41; 106/166.42; 106/166.5; 106/166.6
[58] Field of Search ................ 536/56, 57; 106/166.01, 106/166.4, 166.41, 166.42, 166.5, 166.6

[56] References Cited

U.S. PATENT DOCUMENTS

| | | | |
|---|---|---|---|
| 4,384,113 | 5/1983 | Daly | 536/101 |
| 5,216,144 | 6/1993 | Eichinger et al. | 536/56 |
| 5,362,867 | 11/1994 | Chin et al. | 536/57 |

*Primary Examiner*—Nathan M. Nutter
*Attorney, Agent, or Firm*—Bacon & Thomas

[57] ABSTRACT

A process for producing cellulose solution with low viscosity of 6,000–12,000 poises is disclosed. The process comprises the steps of kneading and dissolving raw cellulose material into a solvent mixture and an anti-polymerization degrading agent to form a cellulose solution which is spun to a fiber or a film of regenerated cellulose. The characteristics of the present process are that:

a. the solvent mixture consists of 40–70 wt % of N-methyl morpholine oxide (NMMO), 20–50 wt % of N-methylol caprolactam (NMC) and 5–35 wt % of tetra methyl ammonium chloride (TMAC);

b. the raw cellulose material is dissolved in the solvent mixture by assistance of a thin film evaporator at 80° C. and 50–150 torr; and c. the anti-polymerization degrading agent is 1000 ppm to 1% of stearyl-3(3',5'-di-ter-4-hydroxyphenyl) propionate.

6 Claims, 6 Drawing Sheets

CELLULOSE SOLUTION WITH LOW VISCOSITY AND PROCESS OF PREPARING THE SAME

The present invention relates to a cellulose solution with low viscosity, and to a process of producing the cellulose solution with low viscosity by dissolving raw cellulose material in a solvent mixture. The present invention also relates to a process of utilizing the cellulose solution when spinning fiber.

BACKGROUND OF THE INVENTION

Conventionally, cellulose rayon is spun by a viscose process. As shown in FIG. 6, sodium hydroxide (NaOH) is added to pulp or raw cellulose material to form an alkali cellulose. After compressing and curing, carbon bisulfide ($CS_2$) is added to xanthate the alkali cellulose to a xanthonic cellulose salt, then a diluted aqueous sodium hydroxide solution is added to dissolve the xanthonic cellulose salt to form a cellulose viscose. Then, the viscose is aged, filtered and induced into a spin-bath containing diluted sulfuric acid, sodium sulfide, zinc sulfide, etc. At the same time, a regenerated cellulose is formed by neutralization and regeneration with the components contained in the spin-bath, namely neutralization and regeneration with the diluted sulfuric acid, sodium sulfide, zinc sulfide, etc. After post-treatment, such as washing, bleaching and drying, a cellulose rayon is obtained. However, the necessary steps for conducting this conventional process are too complicated and time-uneconomical because the cellulose viscose can only be neutralized and regenerated in a spin bath instead of in the air. Additionally, hydrogen sulfide ($H_2S$), carbon bisulfide ($CS_2$) and sodium sulfide ($Na_2S$) produced during the neutralization and regeneration and the metal zinc existing in the waste water will contaminate the environment. Furthermore, the resistance of the spin bath will decrease the velocity of spinning because the neutralization and regeneration of the cellulose viscose can only be done in the spin bath, which will lead to deterioration of the physical properties of the spun fiber. Therefore, the conventional viscose process is seldom applied recently for producing cellulose rayon.

Recently, in order to overcome the drawbacks of the conventional viscose process, a direct solvent-dissolving process has been developed. As shown in FIG. 7, raw cellulose material is dissolved in a solvent to form a cellulose solution. After regenerating, spinning, washing, and drying, a spun fiber is produced. The solvent which is suitable for the direct solvent-dissolving process is N-methyl morpholine oxide. Although this process has the advantages that the solvent can be recovered and re-used, higher speed spinning is possible, lesser containment is produced during neutralization and regeneration, and the physical properties of the spun fiber are much better, etc. the direct solvent-dissolving process still cannot be widely industrially applied because of the following reasons:

1. The raw cellulose material which can be used in the direct solvent-dissolving process is restricted to dissolving pulp which is used in the conventional viscose process and a further activation treatment of pulp is normally required. The source of this type of raw pulp is restricted and expensive, thus the direct solvent-dissolving process is not applicable for mass production;
2. The viscosity of cellulose solution is as high as 12000–30000 poises which will induce the extending difficulty of spun fiber at high speed spinning because of the fluid resistance;
3. The amount of raw cellulose material which can be dissolved in the solvent is relatively low, only in a range of 8–15%. Thus, the cost of applying this process is high because too much solvent is consumed;
4. The decaying of the polymerization degree (DP) of cellulose is very high, which results from the operation conditions of high temperature and long dissolving time required for dissolving the raw cellulose material in the solvent. Thus, the tensile strength of the produced spun fiber decreases;
5. The cost of the solvent is very high and the recovery yield of the solvent is low. The solvent decomposes easily at high temperature, thus the recovery yield of the solvent is only about 94%.

Therefore, although the direct solvent-dissolving process is more preferable than the conventional viscose process, the above drawbacks still hinder its wide application in industry.

SUMMARY OF THE INVENTION

One object of the present invention is to provide a cellulose solution with low viscosity of 6000–12000 poises.

Another object of the present invention is to provide a process of producing cellulose solution with low viscosity, comprising steps of kneading raw cellulose material into a solvent mixture containing anti-polymerization degrading agent to form a cellulose slurry, then dissolving the cellulose material with the aid of a thin film evaporator to form a cellulose solution which is then used to be spun to a fiber or to produce a film of regenerated cellulose, characterized in:

a. the solvent mixture consists of 3 solvents of 40–70 wt % of N-methyl morpholine oxide (NMMO), 20–50 wt % of N-methylol caprolactam (NMC) and 5–35 wt % of tetra methyl ammonium chloride (TMAC);

b. the raw cellulose material is dissolved in said solvent mixture by assistance of a thin film evaporator at 80° C. and 50–150 torr; and c. the anti-polymerization degrading agent is 1000 ppm to 1% of stearyl-3(3',5'-di-tert-4-hydroxyphenyl) propionate based on the weight of the raw cellulose material.

Yet another object of the present invention is to provide a cellulose with a viscosity of 6000–12000 poises and a process of producing the cellulose solution with low viscosity, which can achieve the following results:

1. Broadening the source of the raw cellulose material

Because the present solvent mixture possesses excellent dissolving ability, in addition to the dissolving pulp of soft wood or hard wood the raw cellulose material in accordance with the present invention can also be a pulp of blended with non-dissolving grade. No further activation treatment is required. Additionally, the present solvent mixture generates an excellent swelling property in all the pulps.

2. Enhancing the dissolving ability

The solvent mixture in accordance with the present invention possesses the characteristics of high swelling, high dissolving ability, and high dissolving speed.

3. Reducing the viscosity of the cellulose solution

The viscosity of the cellulose solution is dependent on the polymerization degree of cellulose, the concentration of the cellulose, the temperature of the cellulose solution and the solvent used. Under the same conditions, the viscosity of the cellulose solution is 12% less than that produced from pure normal N-morpholine oxide (NMMO), thus the temperature of spinning can be reduced by 5 to 10° C., which can decrease the decomposing of the solvent mixture. That is, the recovery yield of the solvent mixture can be enhanced by 3 to 8%.

4. Reducing the decaying of the polymerization of cellulose

In the well-known direct solvent-dissolving process, the polymerization degree of the cellulose decays easily because the process is operated under high temperature for a long term. However, the phenomenon is avoided in the present invention because:

a. The operation temperature is kept below 90° C. The present solvent mixture possesses high dissolving ability, thus it can dissolve more than 15% of cellulose at this temperature;

b. The kneading is carried out under a low temperature. Additionally, a thin film evaporator is used to enhance the dissolving ability of raw cellulose material.

c. An anti-polymerization degrading agent is added to reduce DP degradation.

5. The cost of the solvent is reduced.

The cost of the solvent mixture in accordance with the present invention is lower than that of pure NMMO solvent. Further, due to the high dissolving ability of the cellulose solution according to the present invention, the time needed to dissolve the raw cellulose material is reduced from 2 hours to 5 minutes and the operation temperature is reduced by 5 to 10° C.; therefore, the decaying of the solvent is reduced. That is, the recovery yield of the solvent can be enhanced.

DETAILED DESCRIPTION OF THE PREFERRED EMBODIMENTS

Figure 1:
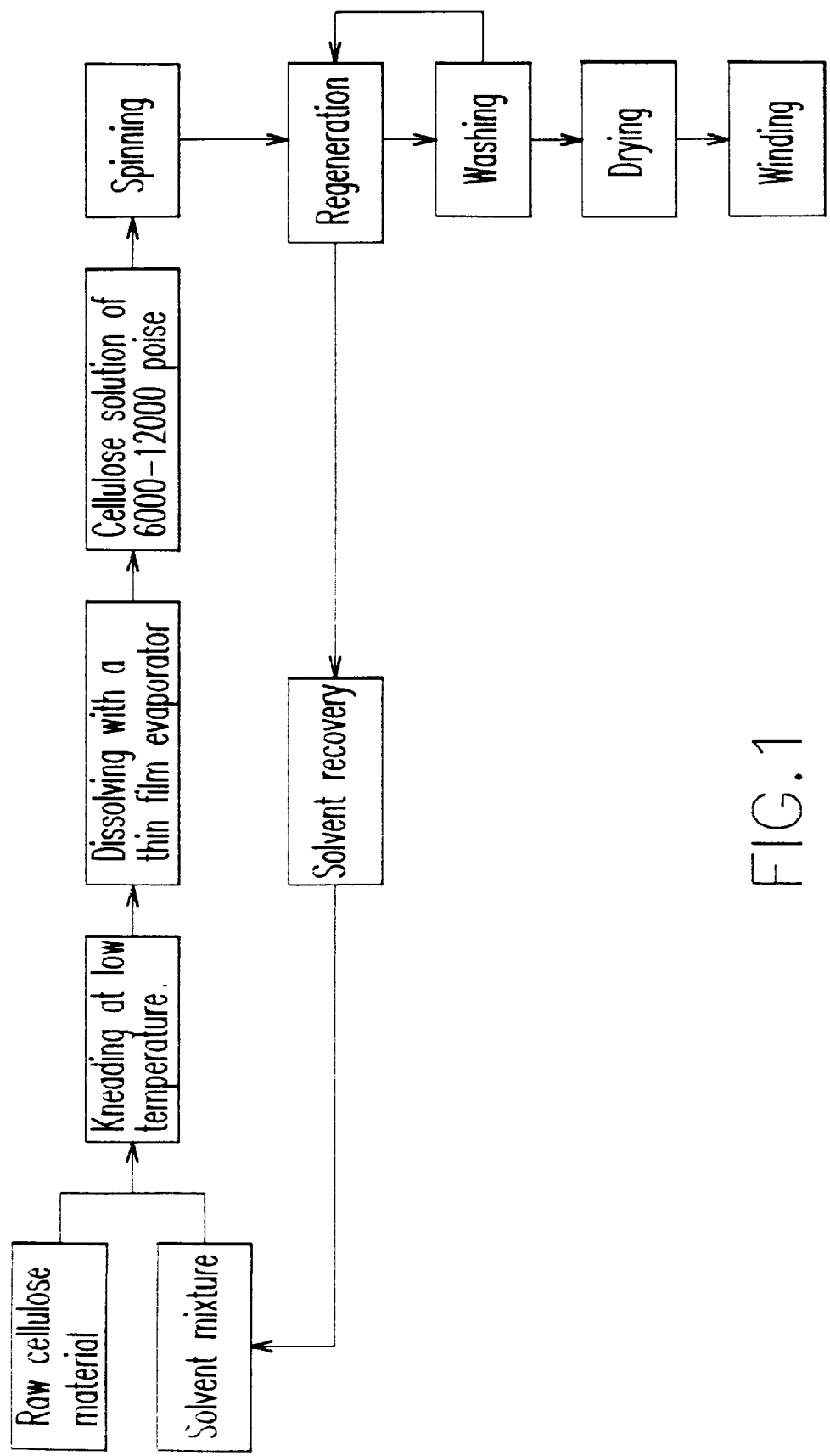
FIG. 1 is a flow chart for spinning fiber, wherein the cellulose solution with low viscosity in accordance with the present invention is used.
Figure 3:
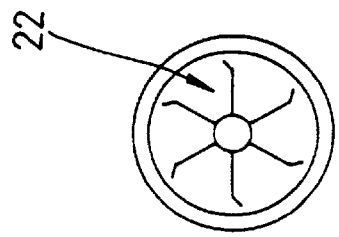
FIG. 3 is a cross sectional view of the thin film evaporator along with the phantom line f—f' of FIG. 2.

The present invention relates to a cellulose solution with low viscosity. Particularly, the present invention relates to a cellulose solution with viscosity of 6000–12000 poises. Referring to the flow chart of FIG. 1, the raw cellulose material is firstly mixed and kneaded with a solvent mixture to form a cellulose slurry. The raw cellulose material can be, in addition to the dissolving pulp of soft wood or hard wood, a non-dissolving pulp fiber can also be used in the present invention. The solvent mixture comprises 40–70 wt % of N-methyl morpholine oxide (NMMO), 20–50 wt % of N-methylol caprolactam (NMC) and 5–35 wt % of tetra methyl amonium chloride (TMAC). In addition to the three components, the solvent mixture may further contain an anti-polymerization degrading agent. The amount of the anti-polymerization degrading agent which can be added is critical and is dependent on the nature of raw cellulose material used. Usually, the anti-polymerization degrading agent is added in an amount of 1000 ppm to 1 wt % based on the weight of the raw cellulose. The preferred anti-polymerization degrading agent in accordance with the present invention is stearyl-3-(3', 5'-di-tert-4-hydroxyphenyl)propionate.

Figure 2:
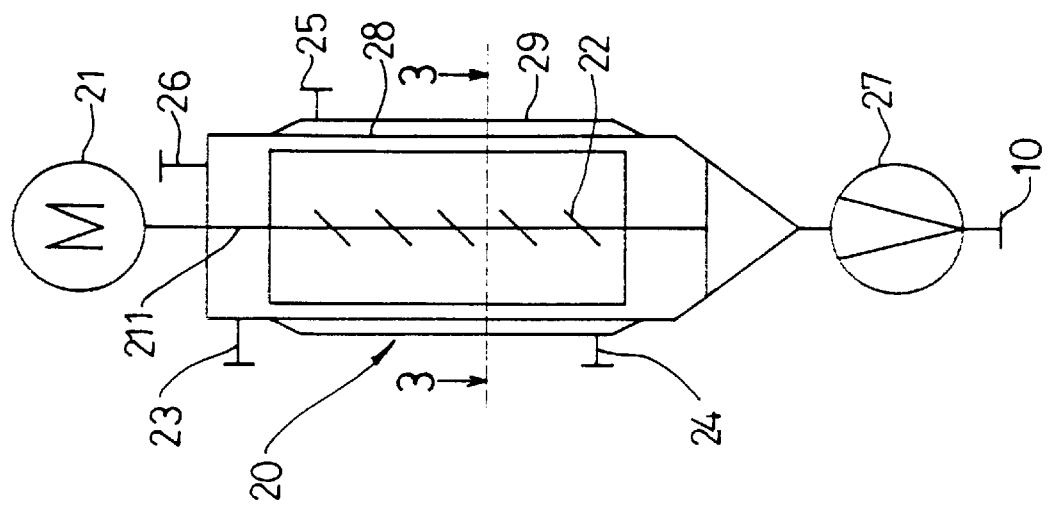
FIG. 2 is a cross sectional view of the thin film evaporator used in the present invention.

The raw cellulose material and the solvent mixture is mixed by a kneader to form a uniform cellulose slurry. It is not necessary to elevate the operation temperature of kneading; a preferred operation temperature ranges from 25–70° C.; usually, ambient temperature is acceptable to uniformly knead and mix the raw cellulose material and the solvent mixture. After kneading, the cellulose slurry is subjected to a thin film evaporator so as to vaporize excess water contained in the cellulose slurry to 9–11% thereof. Referring to FIG. 2, a cross sectional view of a thin film evaporator 20 is disclosed. In working, the cellulose slurry produced in a kneader is fed from an inlet 23 to an inner tank 28 of the thin film evaporator 20. Blades 22 arranged on an axis 211 are rotated by a motor 21 and the cellulose slurry is sprayed to a thin film over the inner surface of the inner tank 28 by the blades 22, and at the same time, the inner tank 28 is vacuumed. The outer tank 29 is a thermal jacket which acts as a heating source for heating the inner tank 28. When the cellulose slurry is sprayed to a film over the inner surface of the inner tank 28, vacuumed and heated by the heating source, excess water contained in the cellulose slurry is quickly vaporized, and the raw cellulose material is uniformly dissolved in the solvent mixture to form a cellulose solution. For example, 16 wt % of cellulose slurry is sprayed to a film in a thickness of 5 mm by the blades 22 in a rotating velocity of 200 rpm. At the same time, the inner tank 28 is vacuumed to 50–150 torr, and is heated at a temperature of 80° C. When the excess water in the cellulose slurry is evaporated to 9–11% thereof within 5 minutes, the raw cellulose material will completely dissolve in the solvent mixture.

After the raw cellulose material is completely dissolved in the solvent mixture, further spinning processes then can be subsequently carried out, such as spinning, air quenching, regenerating, washing, drying, winding, etc.

Figure 4:
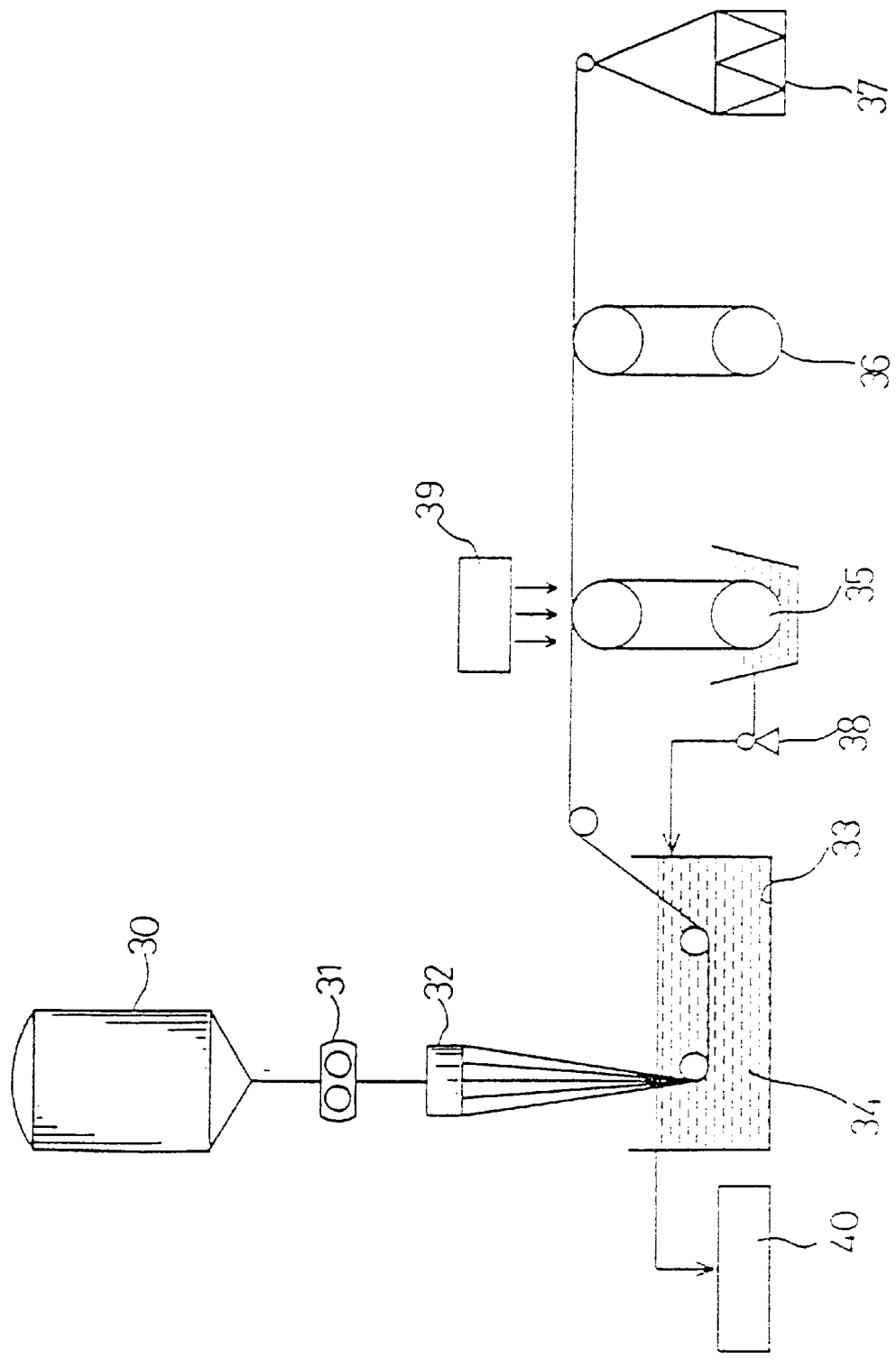
FIG. 4 is a diagrammatic view of a fiber spinning process, wherein the cellulose solution with low viscosity in accordance with the present invention is used for spinning.

As shown in FIG. 4, after the raw cellulose material is dissolved in the solvent mixture, the formed cellulose solution is transferred firstly to a storage tank 30, then secondly a pump 31 and thirdly a spinneret 32, and then is transferred via an air gap to a regenerating tank 34 to regenerate the cellulose solution to a fiber. After being washed with water in a washing tank 35 and dried in a drying zone 36, the fiber is wound by a winding device 37. All the above procedures are well known to those who are skilled in the art, and further explanation is not necessary.

Figure 5:
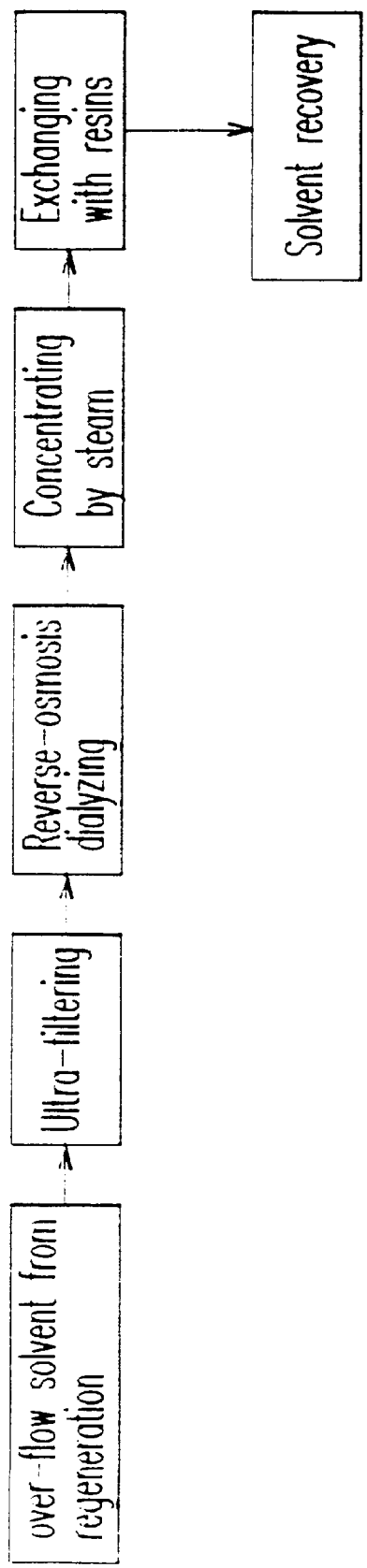
FIG. 5 is a flow chart of recovering the solvent used in the regeneration tank for regeneration in accordance with the present invention.
Figure 6:
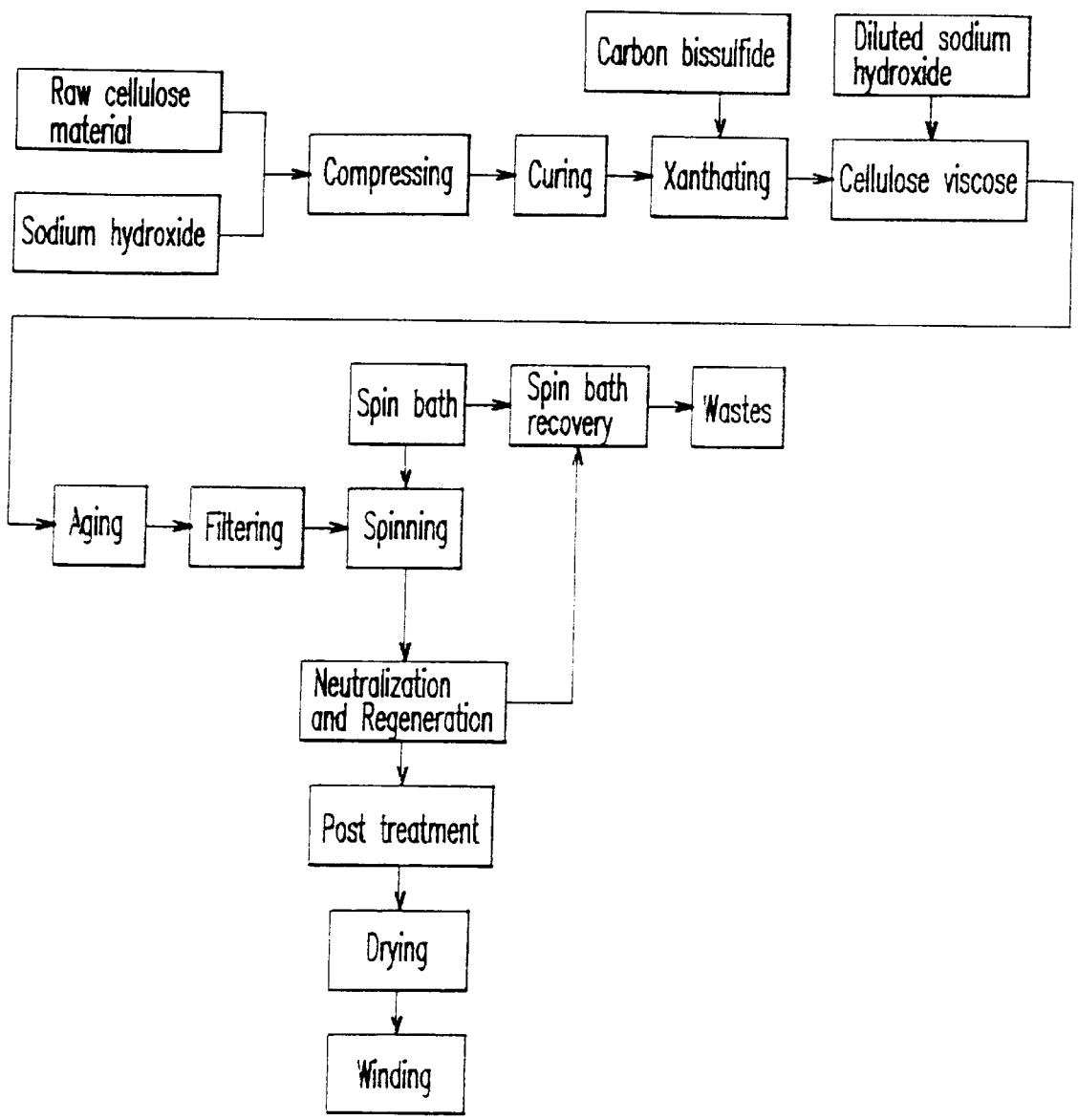
FIG. 6 is a flow chart of spinning fiber according to the conventional viscose process.
Figure 7:
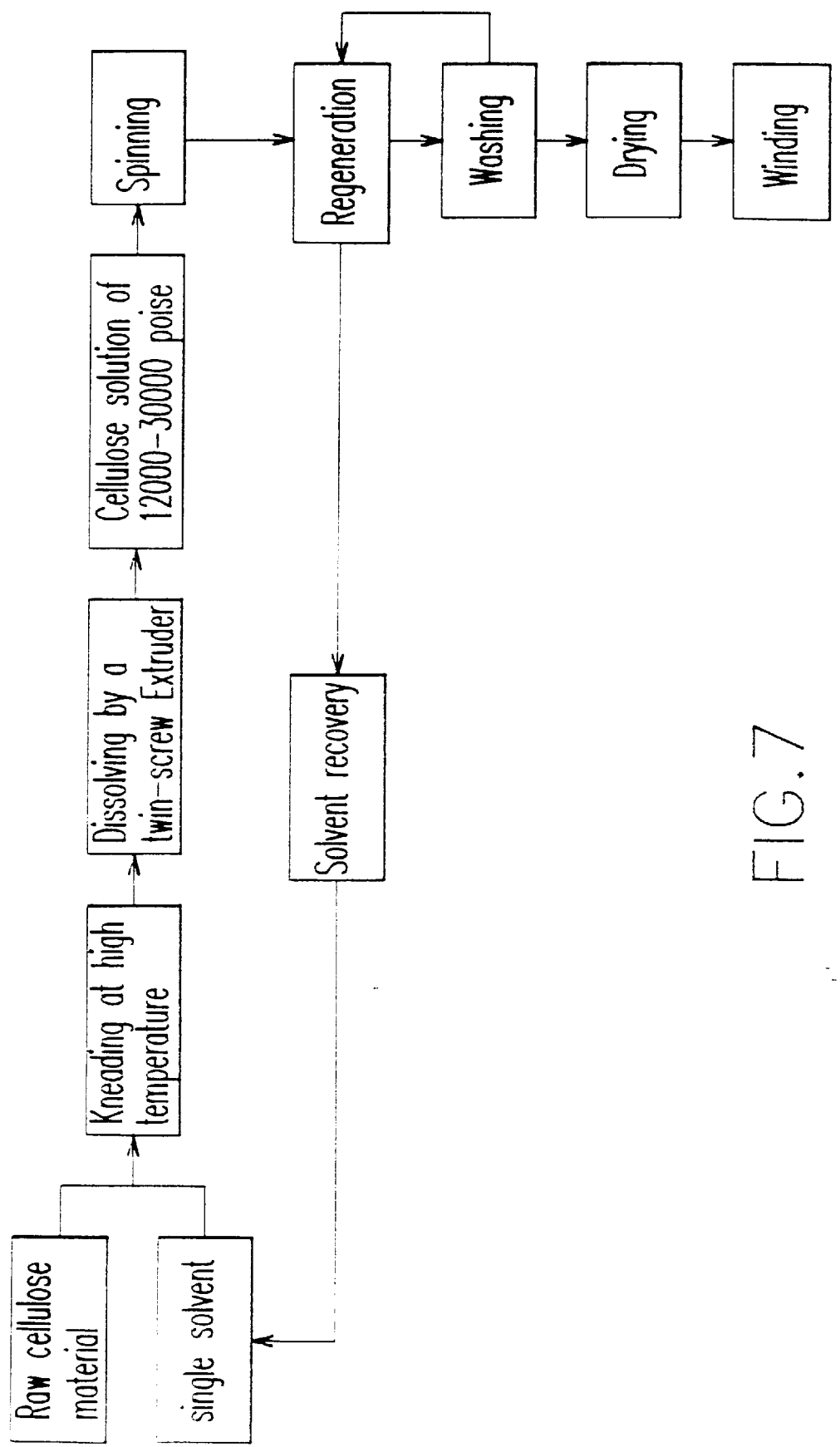
FIG. 7 is a flow chart of spinning fiber according to the well-known direct solvent-dissolving process.

FIG. 5 is a flow chart of recovering the solvent for regeneration used in accordance with the present invention. As shown in FIG. 4, the solvent contained in the regenerated fiber during the procedure of regeneration is washed out in the washing tank 35. The solvent-containing washing water is fed back by a pump 38 to the regeneration tank 34 for re-use, and a portion from the tank is over-flown for solvent recovery. The solvent is recovered by the steps of ultra-filtering, reverse-osmosis dialyzing, concentrating by steam and exchanging with resins. Owing to the dissolving of raw cellulose material in the solvent mixture not being proceeded at an elevated temperature, the amount of fresh solvent required for making up the solvent loss caused by thermo-decomposition is not high, thus the recovery yield of the regenerating solvent can reach at least 99.2%.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A process for producing cellulose solution with low viscosity of 6000–12000 poises, comprising steps of kneading and dissolving raw cellulose material into a solvent mixture and an anti-polymerization degrading agent to form a cellulose solution which is then spun to a fiber or a film of regenerated cellulose, characterized in:
   a. said solvent mixture consists of 40–70 wt % of N-methyl morpholine oxide (NMMO), 20–50 wt % of N-methylol caprolactam (NMC) and 5–35 wt % of tetra methyl ammonium chloride (TMAC);
   b. said raw cellulose material is dissolved in said solvent mixture by assistance of a thin film evaporator;
   c. said cellulose solution contains an anti-polymerization degrading agent of stearyl-3-(3',5'-di-tert-4-hydroxyphenyl)propionate.

2. The process of claim 1, wherein said raw cellulose material is selected from a dissolving pulp of soft wood, hard wood or non-dissolving pulp fiber.

3. The process of claim 1, wherein said raw cellulose material is kneaded with said solvent mixture and an anti-polymerization degrading agent in a kneader at a low temperature of 25–70° C. to form a unrm cellulose surrey.

4. The process of claim 1, wherein said solvent mixture further comprises 1000 ppm to 1% of an anti-polymerization degrading agent of stearyl-3-(3',5'-di-tert-4-hydroxyphenyl) propionate.

5. The process of claim 1, wherein said raw cellulose material is dissolved in said solvent mixture by assistance of a thin film evaporator, where the thin film evaporator is operated under a pressure of 50–150 torr and a temperature of 80° C., to expel excess water contained said cellulose slurry to a range of 9–11% thereof and to facilitate the dissolving of raw cellulose material into said solvent mixture.

6. The process of claim 1, wherein said thin film is in a thickness of 1–5 mm.

* * * * *